Figure 1:
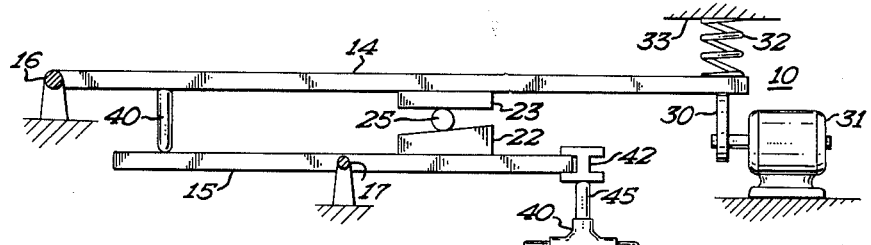

Nov. 23, 1965      F. D. JOESTING      3,219,049

PNEUMATIC TRANSDUCERS

Filed Sept. 11, 1963      2 Sheets-Sheet 1

INVENTOR.
FREDERICK D. JOESTING

BY *Alfred N. Feldman*

ATTORNEY

Nov. 23, 1965  F. D. JOESTING  3,219,049
PNEUMATIC TRANSDUCERS
Filed Sept. 11, 1963  2 Sheets-Sheet 2
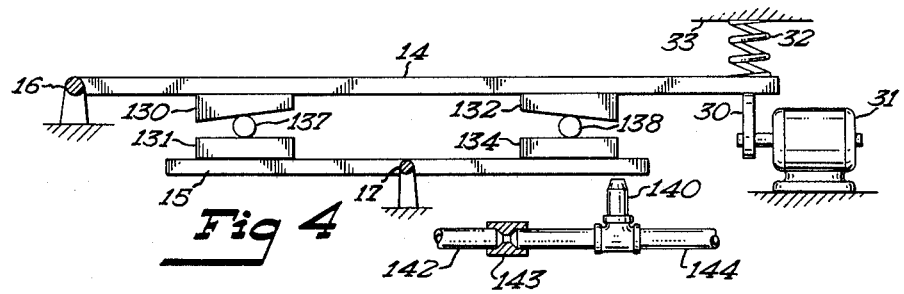
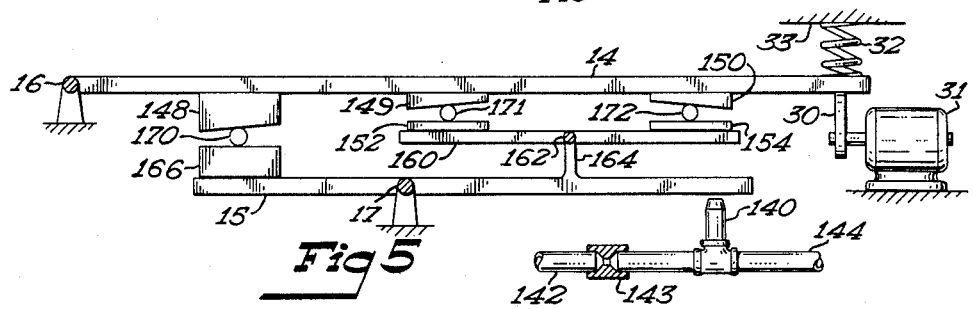
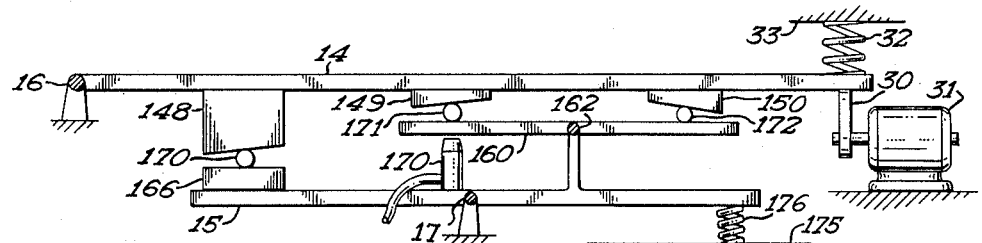
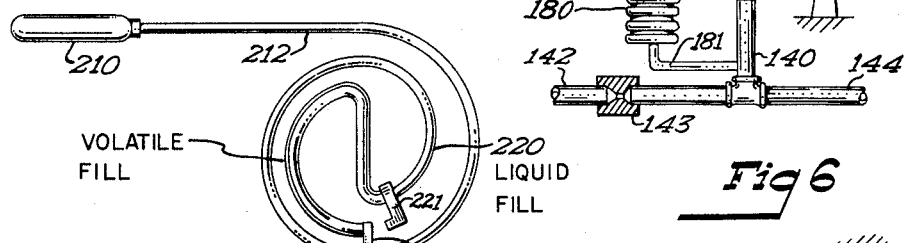
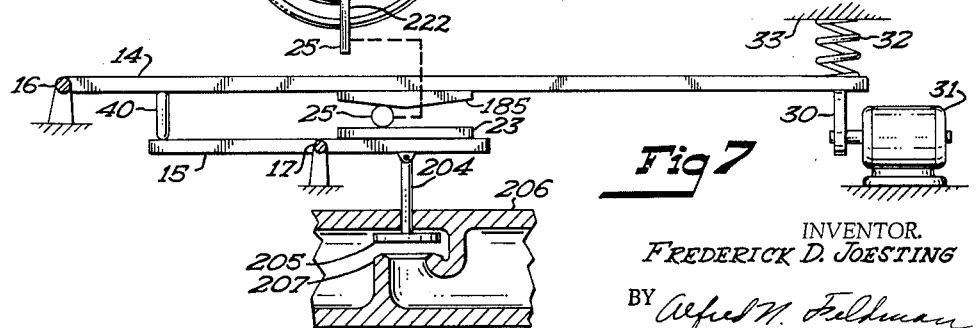
INVENTOR.
FREDERICK D. JOESTING
BY Alfred N. Feldman
ATTORNEY

United States Patent Office 3,219,049
Patented Nov. 23, 1965

3,219,049
PNEUMATIC TRANSDUCERS
Frederick D. Joesting, Park Ridge, Ill., assignor to Honeywell Inc., a corporation of Delaware
Filed Sept. 11, 1963, Ser. No. 308,282
10 Claims. (Cl. 137—85)

This invention relates to a pneumatic transducer particularly adaptable for indicating, measuring, computing or recording functions from either low signal value or low force inputs with the provision for characterizing the relationship between the inputs and outputs to obtain linearity in response, or computing functions, or reverse and direct acting type of controller response.

While apparatus of this general type is old in the prior art, such apparatus has normally been applied in indicating, measuring and recording systems for the purpose of signal amplification and have generally been limited to electric switching type transducers sometimes known as "clamp the needle" type amplifiers. These are on-off type electric circuits which utilize low signal inputs in the form of small signals applied to galvanometer type devices with low force movements into the transducer. They generally resulted in complex structures which had for their sole purpose amplification or motion transmission.

The present invention is directed to a simplified structure of this general type in which electrical or mechanical signal inputs may be amplified and utilized in a proportional type control or indication apparatus and in which the output received therefrom is available over the entire cycle of operation. This type of apparatus requires an auxiliary periodically acting power or motive source such that in the prior art apparatus the control or indication was not effective continuously. In the present invention, this simplified structuer permits change in the output with change in the input signals periodically and with the apparatus providing a uniform output signal during the off cycle. Further, the appartus includes cam or anvil type means associated with the transducer which may be utilized for providing in addition to the proportional control, the introduction of non-linearity to compensate for non-linearities in the output control apparatus or to provide for modification of the input signal in the amplifier in accordance with some mathematical function, or to provide a simplified arrangement for reverse and direct acting proportional control. More particularly the apparatus has provision for plural input signals to provide for computing functions in the transducer and either single or plural outputs therefrom.

Therefore it is an object of this invention to provide an improved apparatus of this type which is simple in construction and operation and which may be relied upon to accurately indicate, measure, compute or record variations in input signals. Another object of this invention is to provide in an improved pneumatic transducer, an arrangement for receiving plural inputs to perform computing functions in accordance with the characterization of the cams or anvils associated with the amplifying apparatus. Still another object of this invention is to provide in an apparatus of this type an improved and simplified means for temporarily holding the output mechanism in its last control position for providing a fixed output during the off cycle of the apparatus. Still another object of this invention is to provide an improved electric pneumatic transducer in which pneumatic or other fluid flow output means may be accurately controlled from a plurality of input signals through a simplified structure. These and other objects of this invention will become apparent from a reading of the attached description together with the drawings wherein, FIGURE 1 is a schematic diagram of a single input type transducer operating directly a controller.

Figure 2:
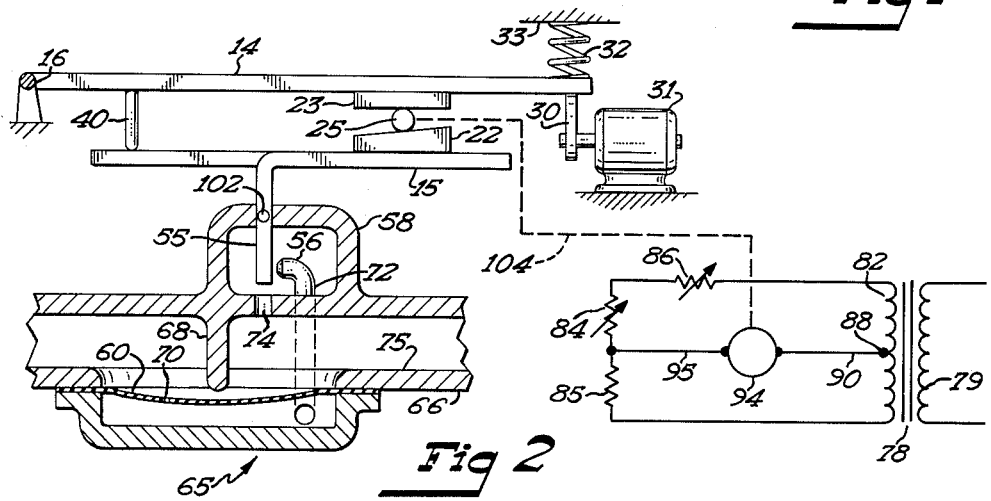
Figure 3:
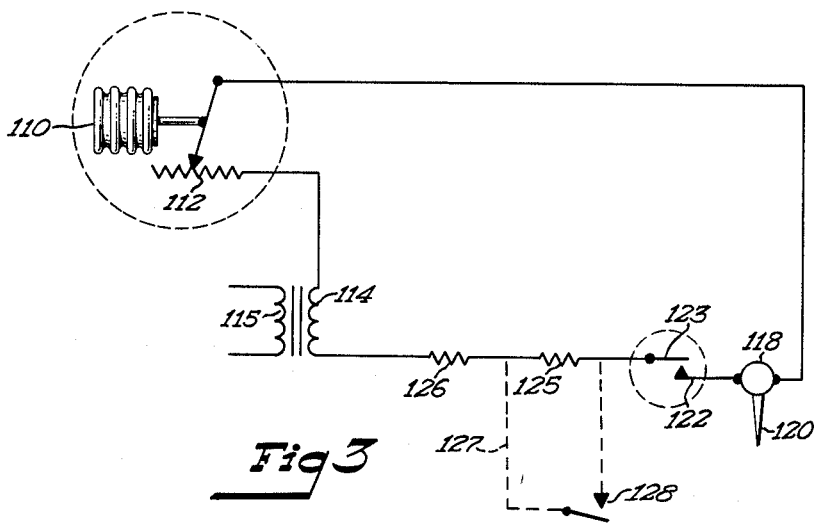

FIGURE 2 is another embodiment of the invention showing a single input type device operating valving in a self contained controller from a simplified electric input circuit, FIGURE 3 is another embodiment of the simplified input circuit mechanism, FIGURE 4 is another embodiment of the invention having a dual input type apparatus, FIGURE 5 is another embodiment of the invention with provisions for three input signals in a controller or computer providing a single output, FIGURE 6 is still another embodiment of the invention having a plurality of inputs and plural outputs from the transducer, and FIGURE 7 is still another embodiment of the invention in which the transducer provides for reverse and direct acting control on the ultimate control device.

My improved pneumatic electric transducer as shown in FIGURE 1 is shown schematically as a single input device operating directly into a valve or controller. The improved transducer indicated generally at 10 includes a pair of lever members or means 14 and 15, the lever means being pivoted respectively through pivots 16 and 17 and being disposed in a side by side or substantially parallel relationship to cooperate in a manner to be hereinafter described. The respective lever means carry parts of an anvil means or cam means indicated at 22, 23 which are designed to cooperate with a pivoted rod like member or needle 25 which provides the input signal or movement to devices of this type. The rod like member or needle or pointer may be associated with a galvanometer or meter type device as will be hereinafter identified in connection with input circuits of various embodiments to be hereinafter disclosed. They may include closed thermal systems, such as Bourdon tubes. In transducing apparatus of this type, the input signal in the form of mechanical movement to the needle or pointer will determine the relationship or relative movement between the levers as they are engaged by the anvils or cams having surfaces thereon which are sloped or characterized to provide for predetermined types of or degrees of output movement from the lever system formed by the lever means 14, 15 depending upon the junction desired.

As will be seen in FIGURE 1, lever means 14 has associated therewith an eccentric cam 30 driven by a continuously running motor 31 which cam bears against the lever means 14 and oscillates it about its pivot 16. Spring means 32 associated therewith and mounted between a fixed support 33 and the lever means urges the lever into engagement with the cam such that the lever means 14 follows the oscillating movement of the eccentric cam in the upward throw of the cam and will urge the lever into engagement through the cams and pointer in the lower throw of the cam. Lever means 15 which is pivoted through a pivot means 17 includes an extension beyond the pivot which is adapted to be engaged by or bear against a flange portion 40 of the lever means 14. The pivot means 17 or lever 15 is of the frictional type such that the lever means must be urged in both directions about its pivot and will normally retain or stay in an operative position whenever the flange portion 40 and the rod like member or needle 25 is out of engagement with the cam part or anvil means 22.

As shown in FIGURE 1, the anvil means 22 is sloped in a substantially uniform slope to provide for substantially proportional action of the valve 40 associated with lever 15. The anvil part 23 is relatively flat or without slope but it will be recognized that either or both of these parts may be interchangeably sloped and may be characterized to provide a non-linear change for the purpose of compensating for non-linearity in the response of an actuator associated therewith or for any other reason as will be outlined below. Thus in FIGURE 1, the lever means 15 is connected at an extremity through a connecting means 42 to the shaft 45 of the valve 40 shown in block form. In this version of the apparatus, the displacement of the needle or pointer in accordance with an electrical input or other type of input signal will move the needle relative to the anvil surfaces and control the positioning of the respective levers 14, 15 such that they will cause movement of the shaft 45 of the valve 40 for operation of the same. The periodic release of the lever 14 or oscillation against the bias 32 by cam movement thereof will free the needle or pointer 25 from the anvil surfaces allowing it to move translationally thereto. These movements will take place with changes in the input signal or in accordance with a condition with which the sensing portion of the pointer apparatus may be associated. The valve or controller 40 will be repositioned periodically by the spring 32 with these input signal changes but will remain in the last control position during the portion of the oscillation period when the signal is being changed due to the frictional pivot 17 of lever 15 associated with the controller. Cam 30 may be so shaped that this on and off time of control by the pointer may be regulated. The flange 40 assures that a change in the condition in a direction of causing counterclockwise movement of the lever 15 will be provided as the lever 14 is brought into proximity therewith.

In FIGURE 2, this simplified version of the electric pneumatic transducer is shown applied to a self contained type valve means of the diaphragm type in which the lever 14 has a flange part or flapper 55 associated therewith which cooperates with a nozzle 56 in the pilot structures 58 of a self contained valve 65 to control the pressure behind a diphragm 60 in the valve 65 thereby controlling flow through the valve body indicated at 66 by moving the diaphragm 60 toward and away from a wier 68 therein. The self contained valve 65 is shown schematically since it is generally conventional and includes an aperture or orifice 70 in the diaphragm by means of which the input or inlet pressure to the valve body 66 may enter the area behind the diaphragm 60 and be controlled in pressure through flow in a conduit 72 connected to the orifice 56. A further aperture 74 in the valve body on the down stream side of the wier 68 permits flow from the nozzle as the pressure behind the diaphragm 60 is established and controlled back through the outlet side of the valve indicated generally at 75. The input mechanism for the pneumatic controller is shown electrically as a circuit which includes an energizing transformer 78 having a primary winding 79 adapted to be connected to an alternating current source of power and a secondary winding 82 connected in a bridge circuit through a plurality of resistors 84, 85 with a control point adjusting potentiometer 86 in series therewith. For purposes of the present disclosure the resistor 84 is shown as variable to simulate a temperature sensor or temperature responsive resistor as responding to a temperature condition and the output of the bridge circuit connected to the secondary winding includes a tap connection 88 in the secondary winding which has connected thereto a conductor 90 leading to a galvanometer type output sensor 94 with the circuit being completed through a conductor 95 to the midpoint of the resistors or common connection between the resistors 84, 85. The galvanometer or meter 94 is shown as mechanically connected through the broken line 100 to the pointer or rod like member 25 in FIGURE 2 associated with the cam or anvil part 23, 22 on the levers 14 and 15. In this embodiment, the structure includes the lever 15 actually being pivoted on a pivot included in or mounted on the valve structure 65. This pivot is identified at 102 and is of the friction type. The lever beyond the pivot includes the extension or flapper 55. As in the preceding embodiment, the pivoted lever means 14 is oscillated by the motor driven cam 30 to provide a means for periodically moving the lever means 14, 15 into and out of engagement and allow the meter 94 to adjust to a new control position. The biasing means 32 associated therewith urges the levers into engagement and provides that the lever 14 will follow the oscillations of the cam 30 leaving the cam at its low point.

This type of input circuit is shown in a modified form in FIGURE 3 in which the primary sensor is a conventional condition sensor or thermostat having a temperature responsive bellows 110 operating an adjustable potentiometer 112 in series with a secondary winding 114 of an energizing source comprised of the primary winding 115 of a transformer which is connected to an alternating current source of power. The wiper of potentiometer 112 is connected through the galvanometer coil of the meter indicated at 118 to control the positioning of the pointer or rod like member 120. A switch indicated at 122, 123 is connected in series therewith and through fixed resistors 125, 126 to the secondary winding to complete this energizing circuit. The switch is adapted to be operated by means of movement of the oscillating lever 14 through energization and operation of the motor driven cam 30. Resistor 125 is shown with a shorting circuit 127 in phantom around the same controlled by a second switch 128 for purposes to be later noted.

The alternate embodiment of the meter energization in circuit merely provide for the pulsating energization of the meter in accordance with the up position of the lever so that the source is not continuously supplying current to the meter except when it is in condition to move or is free to be displaced relative to the anvils or cams on the electric pneumatic transducer levers. This will diminish the heating effect caused by the electric circuit on the bellows 110. The temperature responsive means or bellows will adjust in the potentiometer 112 in accordance with a variation in the temperature condition to reset the pointer as the temperature condition varies in a conventional manner. This embodiment of the input apparatus may be utilized in any of the aforementioned embodiments. The circuit of FIGURE 3 with the addition of the shorting circuit 127 and switch 128 shown in phantom may be used also to control the meter movement or pointer movement with respect to oppositely sloped cams in a system where reverse and direct acting operation of the transducer is required. Shorting of the resistor 125 be switch 128, either manually or automatically, will shift the meter pointer position with respect to an associated cam, as will be later described.

The disclosure of FIGURE 4 is directed to an embodiment of an improved pneumatic transducer having plural inputs. For simplicity, the meter drive or pointer positioning apparatus is omitted since it may take the form shown in FIGURE 3 or as described in FIGURE 2 or be mechanically or otherwise suitably adjusted. The first lever means 14 in this embodiment is as in the preceding embodiment oscillated by means of a motor driven eccentric cam 30 operated by the continuosuly energized motor 31. The lever means in this embodiment includes a pair of anvil means identified at 130, 131 and 133, 134. The anvil or cams 130, 132 are carried by the lever means 14 while the lever means 15 carries the cam parts 131, 134. As in the preceding embodiments, lever means 14 is pivoted through a suitable pivot 16 and lever means 15 is mounted on or journaled on a friction type pivot 17 which enables the lever to remain in position on the release portion of the oscillation cycle of the lever means 14. The pointers or rod like members 137, 138 as indicated above may be included in a meter drive circuit or suitable mechanical input means to provide the introduction of two input signals to the electric pneumatic transducer. The anvil or can means 130, 131 and 132, 134 may be sloped or so characterized as to provide for linear, non-linear, or other mathematical relationships with respect to movement of the needles 137, 138 in accordance with input signals. The lever means 15 cooperates with a nozzle indicated schematically at 140 which nozzle can be connected to a pneumatic source indicated at 142 including a restriction 143 to establish a branch line pressure in an outlet conduit 144 for indicating, recording or controlling purposes. In this plural input type device, the ultimate position assumed by the lever 15 when the lever means 14 is moved into clamping engagement with the pointers 137, 138 will be such as to establish a relationship between the input signals and hence a branch line pressure at the nozzle 140 to produce an output in the conduit 144 in relation to the input signals or the conditions controlling the positioning of the rod like members 137, 138. The biasing means 32 maintains that the lever means 14 will follow the contour of the eccentric cam 30 as it oscillates the lever 14 and the positioning of the lever 15 will be determined by the engagement of the respective anvils with the associated needles. By displacing these needles or pointers transversely with respect to the cam surfaces, different linear or non-linear proportioned movement may be obtained with the lever means 15 which forms the flapper associated with the nozzle 140 to establish the output signal in accordance with a predetermined relationship between the input signals as determined by the cam slopes and their relationship relative to the lever and pivots.

The embodiment shown in FIGURE 5 is substantially identical with that of FIGURE 4 except as to include an additional input point in the electric pneumatic transducer. Again for simplicity, the motivating signal sources for the pointers are omitted for simplicity and the lever means 14 is again oscillated by means of the motor driven cam combination 30, 31 cooperating with a spring 32 to urge the lever into engagement with the lever means 15. As in the before mentioned embodiment, the lever means is pivoted to a friction bearing 17 and cooperates with the nozzle 140 to establish a branch line outlet pressure in the conduit 144 from the source 142. The lever means 14 carries three anvil or cam parts indicated generally at 148, 149 and 150. The cam parts 149, 150 cooperate with similar parts 152, 154 mounted on an additional lever 160 which is pivoted as at 162 on a flange 164 carried by the lever means 15. The cam or anvil part 148 cooperates with a similar part 166 on the lever 15 and each of the pairs of cam parts or levers may be sloped or characterized as to provide for mathematical relationships in accordance with translational movements of their respective pointers or rod like members indicated generally at 170, 171 and 172. Thus translational movement of any of the rod like members 170, 171 or 172 will bring the pointers into engagement with differing portions of the anvils or cam surfaces on the levers 14, 160 and 15 to establish a position for the lever means 15 with respect to the nozzle to provide for an output in the conduit 144 in proportion to the relationships of the input signals. In this embodiment, two of the input signals formed by the cam parts 149, 152, 150, 154 and the associated pointers 171, 172 will with the engagement of the pointer 170 with the cam parts 148, 166 establish a position for the lever means 15 with respect to the lever means 14 to establish an output signal. The cam or anvil parts of this embodiment may be linearly sloped or sloped to provide some predetermined mathematical function such that the ultimate output signal will bear a predetermined relationship between the input signals and these cam surfaces.

The embodiment shown in FIGURE 6 is still another extension of this basic principle in which the lever means 14 and 15 of the pneumatic transducer has associated therewith a plurality of cams and associated pointers for receiving input signals in terms of movement of the pointers with respect to their associated cams or anvils and the sloped or characterized surfaces thereon to provide an output therefrom in accordance with these input signals. This embodiment also includes the force feedback principle of valve control to permit the use of greater slope or curvature on the cams in cases where the movement of the output lever is small. Thus in this embodiment, the arrangement is modified to provide a second output signal in the form of a nozzle 170 associated with the pivoted lever 160, and mounted on lever 15 with the lever 160 being pivoted on the lever 15. In this embodiment, a force feedback on lever 15 is effected by adding an additional pivoted lever 175 between the nozzle 140 and lever 15 with the force from lever 15 being transmitted to lever 175 by a spring 176 positioned therebetween. The output control pressure established at nozzle 140 in addition to being transmitted to output conduit 144 is also impressed on a feedback bellows 180 through a conduit 181 connected between the nozzle 140 and bellows 180. The pressure which is produced in conduit 144 will be proportional to the movement of the lever 15 causing force in spring 176 to be balanced by pressure in feedback bellows 180 acting through lever 175. The motion of lever 15 required for a given change in pressure at 144 will depend on lever ratios, spring rates, and feed back bellows area. These can be varied to utilize a slope or degree of curvature of the cams which is optimum for accuracy, matching characteristics of sensing elements, or for other reasons, while also maintaining the desired input-output relationship. The position of the pointers or rod like members 171, 172 relative to the cams 149, 150 on lever means 14 combines with the positioning of the pointer or input member 170 between the cam surfaces 148, 166 to determine the ultimate position of the lever 160 with respect to nozzle 170 to provide a first output from the electric pneumatic transducer. This ultimate position will be applied to the lever 15 causing it to pivot about its frictional pivot 17 and cooperate with the positioning of the pointer 170 with respect to the anvil means 148, 166 on lever means 14, 15 respectively to position the lever means 15 relative to the nozzle 140 to establish a second output pressure 144 in accordance with all of the conditions sensed.

The modification shown in FIGURE 7 utilizes a single input type controller comprised of lever 14, pivoted about pivot 16 and lever 15 pivoted about the frictional pivot 17. The single cam or anvil surface 185 mounted on lever 14 has two oppositely sloped sections to provide for reverse and direct action of the control or valve shown generally at 200. The eccentric cam 30 and motor 31 driving the same oscillates the position of the lever means 14 against the bias of the spring 32 and the pointer or rod like member 25 may be positioned to one or the other of the sloping surfaces to control the position of lever means 15 about its pivot 17. Operatively connected to the lever means 15 is a pivoted valve stem 204 carrying a valve closure member 205 within a valve body 206, which valve closure member cooperates with a valve seat 207 to control flow through the valve body. The flange 40 on the lever 14 insures that the lever means 15 will return or move counterclockwise about its pivot as the position of the pointer or rod like member 25 changes with respect to the cam in accordance with the input condition sensed. In FIGURE 7 this input condition is shown as a closed thermal system or mechanical signal input system including a bulb 210 connected through a capillary 212 in a liquid, volatile fill temperature sensing system terminating in a helical expansion member, similar to a Bourdon tube, indicated at 220, to which is attached the pointer 25. Tube 220 includes stops 221, 222 which limit movement of the tube during summer operation. The volatile fill portion of the tube, which is limited to the section between stops 221 and 222, responds to temperature of the medium being valved at valve 200 while the bulb is exposed to the ambient of the space to be air conditioned. During winter operation when hot water is the controlling medium being valved, the volatile fill moves the pointer to the winter or left side of the cam to provide for direct acting type of control. No stop is shown in this direction as a "fade-out" fill is used which positions the pointer accurately enough even with variations in the temperature of the hot water. Movement of the pointer to the right or left is due to the liquid fill as the temperature of the ambient changes. Therefore, temperature changes at the volatile fill portion of the mechanical sensing system will limit changes of the needle position to one or the other of the slopes of the anvil. During summer operation in which cold water is the temperature changing medium being valved, the volatile fill will move the pointer to the opposite side of the cam or anvil. In this direction stop 221 contacts stop 222 thus locating the pointer in the correct position for summer temperature control by the sensing bulb 210. A decrease in temperature sensed at the bulb will cause the pointer to move in a clockwise direction and counter-clockwise direction due to the increase in temperature at the bulb. Thus this liquid fill system will cause the pointer 25 to move with respect to one or the other of the surfaces of the anvil 185 depending upon the ambient temperature surrounding the bulb 210 and will move proportionately with variations in this ambient temperature in the range of one or the other of the sloped surfaces of the anvil to provide for reverse and direct acting control of the valve 200 in a conventional manner.

This improved pneumatic transducer as shown in the embodiments in the foregoing figures may utilize single or multiple inputs from low force, low movement type input signals which may be of electrical or mechanical nature to provide for a degree of amplification at a pneumatic output or direct valve operation in accordance with the condition or conditions sensed. The cam or anvil surfaces associated therewith may be characterized or sloped to perform any desired function such as introducing non-linearity to compensate for non-linearity in the controllers or to provide change in the output in accordance with any mathematical function with given changes in the input as determined by the condition or mechanical signal applied thereto. This simplified pneumatic transducer maintains its ultimate control position in the off cycle or portion of the cycle when the drive motor 31 moves the eccentric cam to release the pressure or clamping on the input rod like members or needles such that they may be repositioned in the event that a change in condition has taken place. The ultimate output because of the friction mounting of one of the levers will provide for relatively fixed output during this condition while permitting a change in this output if dictated by the conditions or input signals upon the next clamping cycle when the control lever is repositioned.

Therefore it should be noted that the present disclosure is intended to be illustrative only and the scope of the invention should be determined only by the appended claims.

I claim as my invention:

1. A pneumatic transducer comprising, a first and second pivoted lever means disposed in a side by side relationship, a plurality of characterized anvil means having characterized surfaces positioned on each lever and disposed adjacent to one another, at least one pointer means positioned between the characterized surfaces of a pair of said anvil means, means urging said lever means about their respective pivots such that said anvil means engage and clamp said pointer means, a motor driven eccentric cam cooperating with one of said lever means to periodically pivot said one of said levers providing separation of said anvil means and allowing said pointer to move relative thereto, means including condition responsive means connected to and operative to move said pointer along the surfaces of said anvil means with variation in the condition sensed, and valve means connected to and movable with the other of said lever means to be operated by movement of said lever means in proportion to the changes in said condition.

2. A pneumatic transducer comprising, a first and second pivoted lever means disposed in a side by side relationship, a plurality of characterized anvil means positioned on each lever and disposed adjacent to one another, a plurality of pointers positioned between the characterized surfaces of said anvil means, means urging said lever means about their respective pivots such that said anvil means engage and clamp said pointers, a motor driven eccentric cam cooperating with one of said lever means to periodically pivot said one of said levers providing separation of said anvil means and allowing said pointers to move relative thereto, means including a plurality of condition responsive means connected to and operative to move said plurality of pointers along the surfaces of said respective anvil means with variation in the condition sensed, and means including a pneumatic controller connected to a source of pressure being movable with the other of said lever means to be operated by the other of said lever means and produce a pressure output signal in accordance with the positioning of said pointers relative to their respective anvil means as produced by changes in conditions.

3. A pneumatic transducer comprising, a first and second pivoted lever means disposed in a side by side relationship, a characterized anvil means positioned on each lever and disposed adjacent to one another, a pointer positioned between the characterized surfaces of said anvil means, means urging said lever means about their respective pivots such that said anvil means engage and clamp said pointer, a motor driven eccentric cam cooperating with one of said lever means to periodically pivot said one of said levers providing separation of said anvil means and allowing said pointer to move relative thereto, means including condition responsive means connected to and operative to move said pointer along the surfaces of said anvil means with variation in the condition sensed, and means including a controller connected to and movable with the other of said lever means to be operated by movement of said lever means in accordance with changes in said condition, said pivoted lever means including frictional pivot means to maintain the other of said lever means in whatever position it assumes as a result of engagement of said anvil means on said lever means with said pointer during the period when said one of said lever means is displaced from the other of said lever means by said eccentric cam.

4. A pneumatic transducer comprising, a first and second pivoted lever means disposed in a side by side relationship, a plurality of characterized anvil means positioned on each lever and disposed adjacent to one another, a plurality of pointers positioned between the characterized surfaces of said anvil means, means urging said lever means about their respective pivots such that said anvil means with variation in the signal inputs, and means driven eccentric cam cooperating with one of said lever means to periodically pivot said one of said levers providing separation of said anvil means and allowing said pointer to move relative thereto, means including a plurality of mechanical signal input means connected to and operative to move said pointers along the surfaces of said anvil means with variation in the signal inputs, and means including a pneumatic controller connected to and movable with the other of said lever means to be operated by movement of said lever means in accordance with a mathematical relationship between said signal inputs, said pivoted lever means including frictional pivot means to maintain the other of said lever means in whatever position it assumes as a result of engagement of said anvil means on said lever means with said pointers during the period when said one of said lever means is displaced from the other of said lever means by said eccentric cam.

5. A pneumatic transducer comprising a plurality of pivoted lever means disposed in adjacent relationship, characterized cam means positioned on some of said levers, a plurality of rod like members cooperating with said cam means to be engaged thereby and vary the relative position of said levers in accordance with the position of said rod-like members relative to its respective cam means, biasing means urging said plurality of lever means about their respective pivots such that said cam means will normally be in engagement with and clamp said rod like members, continuously operated means associated with at least one of said lever means for periodically overcoming the effect of said biasing means and freeing said rod like members for movement relative to the respective cam means, means including a plurality of condition responsive means connected respectively to said rod like members for varying the position of said members with respect to the associated cam means upon variations in the respective conditions sensed, and means including pneumatic controller connected to and movable with one of said lever means, said one of said lever means being movable as a result of the position of the rod like members with their respective cam means to provide an output from said controller in proportion to the changes in the plurality of conditions sensed.

6. A pneumatic transducer comprising a plurality of pivoted lever means disposed in adjacent relationship, characterized cam means positioned on some of said levers, a plurality of rod like members cooperating with said cam means to be engaged thereby and vary the relative position of said levers in accordance with the position of said rod like members relative to its respective cam means, biasing means urging said plurality of lever means about their respective pivots such that said cam means will normally be in engagement with and clamp said rod like members, continuously operated means associated with at least one of said lever means for periodically overcoming the effect of said biasing means and freeing said rod like members for movement relative to the respective cam means, means including a plurality of condition responsive means connected respectively to said rod like members for varying the position of said members with respect to the associated cam means upon variations in the respective conditions sensed, and means including pneumatic controller connected to and movable with one of said lever means, said one of said lever means being movable as a result of the position of the rod like members with their respective cam means to provide an output from said controller in proportion to the changes in the plurality of conditions sensed, said pivoted lever means including frictional pivot means to maintain said one of said lever means in whatever position it assumes as a result of engagement of said characterized cam means with said rod like members during the period when said continuously operated means overcomes the biasing means to free said rod like members.

7. A pneumatic transducer comprising a plurality of pivoted lever means disposed in adjacent relationship, characterized cam means positioned on some of said levers, a plurality of rod like members cooperating with said cam means to be engaged thereby and vary the relative position of said levers in accordance with the position of said rod like members relative to its respective cam means, biasing means urging said plurality of lever means about their respective pivots such that said cam will normally be in engagement with and clamp said rod like members, continuously operated means associated with at least one of said lever means for periodically overcoming the effect of said biasing means and freeing said rod like members for movement relative to the respective cam means, means including a plurality of signal input means connected respectively to said rod like members for varying the position of said members with respect to the associated cam means upon variations in the input signals, and means including pneumatic controller connected to and movable with one of said lever means, said one of said lever means being movable as a result of the position of the rod like members with their respective cam means to provide an output from said controller in proportion to the changes in the plurality of input signals.

8. A pneumatic transducer comprising a plurality of pivoted lever means disposed in adjacent relationship, characterized cam means positioned on some of said levers, a plurality of rod like members cooperating with said cam means to be engaged thereby and vary the relative position of said levers in accordance with the position of said rod like members relative to its respective cam means, biasing means urging said plurality of lever means about their respective pivots such that said cam will normally be in engagement with and clamp said rod like members, continuously operated means associated with at least one of said lever means for periodically overcoming the effect of said biasing means and freeing said rod like members for movement relative to the respective cam means, means including a plurality of mechanical signal input means connected respectively to said rod like members for varying the position of said members with respect to the associated cam means upon variations of said input signals, and means including controller connected to and movable with one of said lever means, said one of said lever means being movable as a result of the position of the rod like members with their respective cam means to provide an output from said controller in proportion to the changes in the plurality of input signals.

9. A pneumatic transducer comprising a plurality of pivoted lever means disposed in adjacent relationship, characterized cam means positioned on some of said levers, a plurality of rod like members cooperating with said cam means to be engaged thereby and vary the relative position of said levers in accordance with the position of said rod like members relative to its respective cam means, biasing means urging said plurality of lever means about their respective pivots such that said cam will normally be in engagement with and clamp said rod like members, continuously operated means associated with at least one of said lever means for periodically overcoming the effect of said biasing means and freeing said rod like members for movement relative to the respective cam means, means including a plurality of signal input means connected respectively to said rod like members for varying the position of said members with respect to the associated cam means upon variations in the input signals, and means including pneumatic controller connected to and movable with one of said lever means, said one of said lever means being movable as a result of the position of the rod like members with their respective cam means to provide an output from said controller in proportion to the changes in the plurality of input signals, said pivoted lever means including frictional pivot means to maintain said one of said lever means in whatever position it assumes as a result of engagement of said characterized cam means with said rod like members during the period when said continuously operated means overcomes the biasing means to free said rod like members.

10. A pneumatic transducer comprising a first and second pivoted lever means disposed in a side by side relationship, a characterized anvil means having a pair of oppositely sloped surfaces on one of said lever means and disposed adjacent the other of said lever means, a pointer positioned between the characterized surfaces of said anvil means, means urging said lever means about their respective pivots such that said anvil means engage and clamp said pointer, a motor driven eccentric cam cooperating with one of said lever means to periodically pivot said one of said levers providing separation of said anvil means and allowing said pointer to move relative thereto, means including condition responsive means connected to and operative to move said pointer along the oppositely sloped surfaces of said anvil means with variation in the condition sensed, and means including a controller connected to and movable with the other of said lever means to be operated by movement of said lever means in accordance with changes in said condition, the respective surfaces on said anvil means when engaged by said pointer providing respectively for a reversal in the direction of said controller with the same direction of change in said condition.

References Cited by the Examiner

UNITED STATES PATENTS 2,507,489  5/1950  Brown.
3,159,343  12/1964  Hudson _____ 235—61 X ISADOR WEIL, *Primary Examiner.*

ALAN COHAN, *Examiner.*